UNITED STATES PATENT OFFICE.

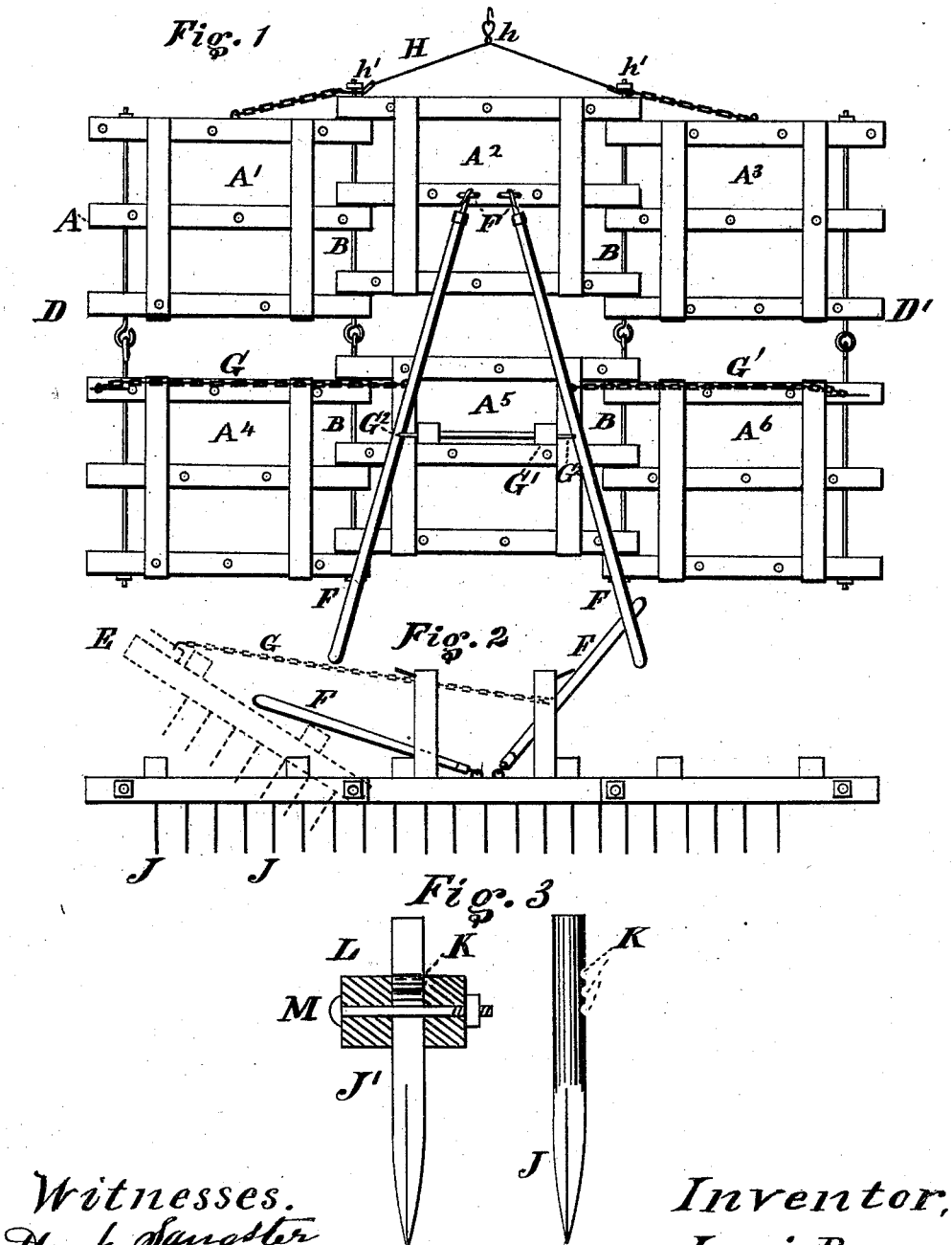

LEVI BROWN, OF ANGOLA, NEW YORK.

IMPROVEMENT IN HARROWS.

Specification forming part of Letters Patent No. 203,585, dated May 14, 1878; application filed April 9, 1878.

*To all whom it may concern:*

Be it known that I, LEVI BROWN, of Angola, in Erie county, and State of New York, have invented certain new and useful Improvements in Harrows, which improvements are fully set forth in the following specification and accompanying drawings, in which—

Figure 1 is a plan or top view; Fig. 2, a front elevation; and Fig. 3 represents an enlarged view of one of the teeth, showing the manner of attaching it to the harrow-frame.

The object of this invention is to provide the means for cutting the ground fine or close, and at the same time allow the teeth to be set sufficiently far apart to allow obstructions to pass freely between them; also, to provide a simple and effectual means for fastening the teeth in place, whereby they may be conveniently adjusted when worn short, and securely held in position when fastened, and to afford the means whereby either side of the harrow may be readily lifted when required, so as to avoid or pass an obstruction.

The first part of the invention consists of a harrow-frame, divided into sections and jointed together, in combination with two operating-levers, so that either side may be lifted up to pass or avoid an obstruction, as will be more clearly hereinafter shown.

The second part of the invention consists in the arrangement of the teeth in the framework of the harrow, which are placed about thirteen and one-half inches apart in each bar; but in each bar the teeth are set to one side a distance about equal to its own diameter, so that if a line were connected to a front tooth, and drawn from thence to the rear of the machine, (at right angles to the front of the same,) the tooth behind in the next bar would be about one and five-eighths inch from the line of draft of the preceding tooth, the tooth in the next bar one and five-eighths farther, and so on through the series, so that when the harrow is drawn over the ground it will cut it in lines not more than one and five-eighths of an inch apart, although the teeth are none nearer than thirteen inches and one-half from each other.

The third part of the invention consists in the method of holding the teeth and making them adjustable by means of two or more grooves cut at right angles to the tooth, and combined with a bolt which passes through the bar and fills the groove, thereby holding it firmly, the arrangement being such that when a tooth is worn short it can be adjusted by withdrawing the bolt and replacing it when the tooth is let down one notch or groove.

In said drawings, A represents the frame of the machine. It is composed of six sections, $A^1$ $A^2$ $A^3$ $A^4$ $A^5$ $A^6$, which are jointed at B on parallel lines, so that either side, D or D', may be made to swing up, if required, as shown by the dotted lines E, Fig. 2, for the purpose of passing an obstruction. They are lifted or let down by means of the levers F (which are jointed to the machine at F', so as to swing freely in any direction) and the chains G. $G^1$ represents a small framework fastened to one section of the machine. It is provided on each side with projecting lugs $G^2$, over which the levers F, or either of them, may be rested, as shown in Fig. 2, when holding up one or both of the side sections D D'.

H represents the draft-rod. It is provided with a twist or an eye in the center $h$ to receive a hook to attach the whiffletrees to, and a link and hook at each end to hook into the chain that is fastened to the outside sections or wings and to the rods that hold the sections together.

J represents the teeth of the harrow. They are made of steel, about eight inches long and five-eighths of an inch diameter, three inches of the upper part being round, the remaining portion of any suitable form for a harrow-tooth.

In Fig. 3, K represents three grooves cut across the face of the tooth in the round portion. There may be more or less of these grooves.

J', same figure, represents a tooth, showing a face view of the grooves K. L shows a section through one of the frame-bars, and M a bolt which passes through it to hold the teeth in, one side of the bolt M resting in a groove, K.

It will be readily seen that as the teeth wear away they may be let down the distance of another groove, and so adjusted.

I claim as my invention—

The combination of the jointed sections $A^1$ $A^4$ and $A^3$ $A^6$, forming the outer jointed wings D D', pivoted on parallel lines B B, frame $G^1$, provided with the lugs $G^2$, and levers F, attached to chains G and swinging freely over the frame $G^1$, substantially as and for the purposes described.

LEVI BROWN.

Witnesses:
BELDEN WILCOX,
ORLIN C. BROWN.